US010096129B2

(12) United States Patent
Narang et al.

(10) Patent No.: US 10,096,129 B2
(45) Date of Patent: *Oct. 9, 2018

(54) THREE-DIMENSIONAL MAPPING OF AN ENVIRONMENT

(71) Applicant: Otsaw Digital Pte. Ltd., Singapore (SG)

(72) Inventors: Gautam Narang, South San Francisco, CA (US); Ling Ting Ming, Singapore (SG)

(73) Assignee: Otsaw Digital Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/828,897

(22) Filed: Dec. 1, 2017

(65) Prior Publication Data

US 2018/0204338 A1 Jul. 19, 2018

Related U.S. Application Data

(63) Continuation of application No. 15/484,279, filed on Apr. 11, 2017, now Pat. No. 9,870,624.

(30) Foreign Application Priority Data

Jan. 13, 2017 (SG) .......................... 10201700299Q

(51) Int. Cl.
*G06T 7/521* (2017.01)
*G06T 7/73* (2017.01)
*G06T 7/55* (2017.01)

(52) U.S. Cl.
CPC ............. *G06T 7/521* (2017.01); *G06T 7/55* (2017.01); *G06T 7/74* (2017.01);
(Continued)

(58) Field of Classification Search
CPC combination set(s) only.
See application file for complete search history.

(56) References Cited

U.S. PATENT DOCUMENTS 6,815,636 B2 * 11/2004 Chung ............... G05D 23/1919
219/121.65
9,229,108 B2 * 1/2016 Debrunner .............. G01S 17/89
(Continued)

FOREIGN PATENT DOCUMENTS

CN 106595659 4/2017
WO 2016207669 12/2016

OTHER PUBLICATIONS

Young Min Kim, et al., "Multi-view Image and ToF Sensor Fusion for Dense 3D Reconstruction", Computer Vision Workshops (ICCV Workshops), 2009 IEEE 12th International Conference, Sep. 27-Oct. 4, 2009, 8 pages.

(Continued)

*Primary Examiner* — Anand Bhatnagar
(74) *Attorney, Agent, or Firm* — Fox Rothschild LLP

(57) ABSTRACT

A system for registering a three dimensional map of an environment includes a data collection device, such as a robotic device, one or more sensors installable on the device, such as a camera, a LiDAR sensor, an inertial measurement unit (IMU), and a global positioning system receiver. The system may be configured to use the sensor data to perform visual odometry, and/or LiDAR odometry. The system may use IMU measurements to determine an initial estimate, and use a modified generalized iterative closest point algorithm by examining only a portion of scan lines for each frame or combining multiple feature points across multiple frames. While performing the visual and LiDAR odometries, the system may simultaneously perform map registration (Continued)

through a global registration framework and optimize the registration over multiple frames.

24 Claims, 6 Drawing Sheets

(52) U.S. Cl.
CPC ............... *G06T 2207/10016* (2013.01); *G06T 2207/10028* (2013.01); *G06T 2207/30204* (2013.01); *G06T 2207/30248* (2013.01)

(56) References Cited

U.S. PATENT DOCUMENTS

| | | | | |
|---|---|---|---|---|
| 2002/0122185 | A1* | 9/2002 | Ono | G01B 11/25 356/601 |
| 2006/0182314 | A1* | 8/2006 | England | G01C 15/002 382/106 |
| 2009/0224432 | A1* | 9/2009 | Nagatomo | B23K 26/032 264/400 |
| 2010/0020074 | A1* | 1/2010 | Taborowski | G06T 7/70 345/420 |
| 2010/0157021 | A1* | 6/2010 | Abraham | G06Q 30/06 348/47 |
| 2011/0255749 | A1* | 10/2011 | England | G01C 15/002 382/106 |
| 2012/0089295 | A1 | 4/2012 | Ahn et al. | |
| 2014/0064555 | A1* | 3/2014 | Sebastian | G06T 5/003 382/103 |
| 2014/0300884 | A1* | 10/2014 | Sebastian | G01C 11/02 356/4.01 |
| 2015/0021190 | A1* | 1/2015 | Schmitz | C25D 1/003 205/50 |
| 2016/0104289 | A1 | 4/2016 | Chang et al. | |
| 2016/0282468 | A1* | 9/2016 | Gruver | G01S 17/93 |
| 2016/0353095 | A1* | 12/2016 | Tait | H04N 13/0431 |
| 2017/0104980 | A1* | 4/2017 | Tran | G06T 7/593 |
| 2017/0108332 | A1* | 4/2017 | Cossairt | G01B 11/2518 |
| 2017/0115387 | A1* | 4/2017 | Luders | G01S 13/865 |
| 2017/0122736 | A1* | 5/2017 | Dold | G01S 17/023 |
| 2017/0168494 | A1* | 6/2017 | Sibenac | G05D 1/0231 |
| 2017/0176597 | A1* | 6/2017 | Gruver | G01S 17/936 |

OTHER PUBLICATIONS

Ji Zhang, et al., "LOAM: Lidar Odometry and Mapping in Real-Time", Robotics: Science and Systems, vol. 2 2014, 9 pages.
Michael Bosse, et al, "Zebedee: Design of a Spring-Mounted 3-D Range Sensor with Application to Mobile Mapping", IEEE Transactions on Robotics, vol. 28, No. 5, Oct. 2012, 16 pages.
Aleksandr V. Segal, et al., "Generalized-ICP", Robotics: Science and Systems, vol. 2, Issue 4, Jun. 2009, 8 pages.
Nathan A. Carr, et al., "The Ray Engine", Graphics Hardware, Sep. 2002, pp. 37-46.
Timothy D. Barfoot, et al., "Into Darkness: Visual Navigation Based on a Lidar-Intensity-Image Pipeline", Springer International Publishing Switzerland, vol. 114, Apr. 23, 2016, pp. 487-504.
Sean Anderson, et al., "RANSAC for Motion-Distorted 3D Visual Sensors", IEEE/RSJ International Conference on Intelligent Robots and Systems, Nov. 3-7, 2013, Tokyo, Japan, pp. 2093-2099.
Ji Zhang et al., "Visual-lidar Odometry and Mapping: Low-drift, Robust, and Fast", 2015 IEEE International Conference on Robotics and Automation (ICRA), Seattle, Washington, May 26-30, 2015.
Sock, J. et al, "Probabilistic Traversability Map Generation Using 3D-LIDAR and Camera", 2016 IEEE International Conference on Robotics and Automation (ICRA), May 16-21, 2016, pp. 5631-5637 (Abstract).

\* cited by examiner

THREE-DIMENSIONAL MAPPING OF AN ENVIRONMENT

RELATED APPLICATIONS

This patent document is a continuation of U.S. patent application Ser. No. 15/484,279, filed Apr. 11, 2017 (the '279 Application), which claims priority under 35 U.S.C. 119(b) to Singapore Patent Application No. 10201700299Q (the '299Q Application) filed Jan. 13, 2017. The disclosures of both '279 Application and '299Q application are incorporated herein by reference in their entireties.

BACKGROUND

This disclosure relates to methods and systems for performing three-dimensional (3D) mapping of an environment using data collection devices such as a laser scanner.

Reconstructing 3D maps from laser scanners is an under constrained problem because the scanner, which is typically installed on a robotic platform, is constantly moving in an unknown trajectory, and the available sensor data only provides a discretized slice of the reality. Typically, in robotic mapping, a simultaneous localization and mapping (SLAM) is used to construct or update a map of an unknown environment while simultaneously keeping track of a robot's location within it.

Most existing mapping systems use a Light Detection and Ranging (LiDAR, LIDAR or LADAR) sensor that measures distance to a target by illuminating the target with a laser light. However, LiDAR-based 3D mapping suffers some drawbacks. For example, map registrations based on LiDAR data may generate errors, particularly after long continuous scans. Rotational drifts around corners and translational drifts in relatively featureless environments or when transitioning between environments with abrupt feature changes (e.g., from room to hallway or from inside to outside) may cause the majority of the errors. In previous experiments, it was found that up to 60% of scans had visible registration problems such as phantom walls, skewing, open ended loops etc. This requires human intervention to remedy, wherein the operator reviews the data, adjusts the mapping algorithm and flags the scans for re-registration. In another experiment, 25% of all scans using commercial mapping systems failed to generate usable maps.

It is therefore desirable to develop a 3D mapping system that can produce registration with high accuracy from continuous scan for an extended period of time that requires reasonable computation time. This document describes devices and methods that are intended to address at least some issues discussed above and other issues.

SUMMARY

In one embodiment, a method of constructing a three-dimensional map of an environment includes using a laser scanner that moves about an environment to collect scan line data from multiple scans of the environment, where each of the scans includes one or more scan lines, each returning a data value indicating a distance between the laser scanner and a point on a surface of a structure in the environment. The method also includes using at least one other sensor that also moves about the environment with the laser scanner to collect additional sensor data corresponding to the environment. The method further includes using a processor to obtain the scan line data from the laser scanner, extract one or more feature points from the scan line data, and develop a laser scanner-based odometry from the feature points. The method also includes obtaining the additional sensor data from at least one other sensor. In some embodiments, the method may include developing an additional odometry from the additional sensor data, such as a camera odometry from camera image data, and performing sensor fusion to supplement the laser scanner-based odometry with the additional odometry to develop a three-dimensional map of the environment. Alternatively, and/or additionally, the method may include using data from other sensors, such as raw inertial measurement unit (IMU) data or GPS coordinates. The method may save the map to a memory device.

In some embodiments, the method may further include analyzing the feature points and the additional sensor data to detect multiple landmarks in the environment, each landmark having one or more features. In developing the laser scanner-based odometry from the scan line data, the method may use an improved iterative closest point (ICP) algorithm to estimate a change in position of the laser scanner based on the scan line data and multiple landmarks. For each instance of the scans of the laser scanner, the method may include identifying a window that has scan lines from one or more scans occurring immediately before or after the instance of the scan, identifying multiple matching points from the one or more feature points extracted from the scan line data corresponding to one or more scans occurring immediately before or after the instance of the scan, adjusting the number of matching points based on a distance of the laser scanner to each of the plurality of matching points, and using an Extended Kalman Filter (EKF) for sensor fusion and thus fusing the data to estimate the change in position of the laser scanner based on the adjusted number of matching points. The method may also include performing map registration through a global registration framework.

In some embodiments, in identifying multiple matching points, the method may include evaluating a curvature of each of the feature points to determine whether the point is beyond a corner point, and excluding the point from being a matching point if the point is determined to be beyond a corner point. Alternatively, and/or additionally, the method of identifying multiple matching points from the one or more feature points may also include, for each of the plurality of feature points, extracting a feature descriptor for the feature point, and determining whether the feature point corresponds to a landmark by matching the feature point to a point of a collection of feature points based on an Euclidian distance therebetween and the feature descriptor of the point.

In some embodiments, the at least one other sensor may include an inertial measurement unit (IMU), and using the improved ICP to estimate the changes in position may include using measurements from the IMU to determine an initial estimate of a position of a device holding the laser scanner and the IMU.

In some embodiments, the at least one other sensor may also include a camera, such as a monocular camera or a stereo camera, and the additional odometry may be a camera odometry. In some embodiments, the method may include obtaining a sequence of images from a monocular camera, and developing the camera odometry may include identifying multiple matching points by finding one or more feature points in the sequence of images within the identified window from the LiDAR sensor data. The method may further include determining a scale for scaling the camera odometry by using a depth registration between the scan line data from the laser scanner and the images from the camera, or using data obtained from an inertial measurement unit (IMU).

In some embodiments where a binocular (stereo) camera is used, identifying the multiple matching points may also include, for each of the extracted feature points, extracting a feature descriptor for the feature point and determining whether the feature point corresponds to a landmark. This can be done by matching the feature point to a point of a collection of feature points based on an Euclidian distance and the feature descriptor of the point. The feature descriptor may include one or more camera based features and/or LiDAR based features.

In some embodiments, in the improved iterative closest point (ICP) algorithm for developing the laser scanner-based odometry, for each instance of the scans from the laser scanner, the method may include obtaining a first set of points from the instance of the scan and a second set of points from one or more previous scans of the laser scanner, using the first and second set of points to estimate a first change in position of the laser scanner, obtaining a third set of points that include a number of most recent points from the laser scanner, determining the laser scanner-based odometry based on the estimated first change in position and the third set of points, and optimizing the odometry using a graph optimization process. In some embodiments, the graph optimization process may be a general graph optimization (G2O) or Gauss-Schneider-based graph.

In some embodiments, the method may include self-diagnosis, in which the method may perform a supervised machine learning algorithm on locally extracted features, such as 3D spatial distribution of data, Euclidean distribution of points, and several other features. The system may train a model that correlates these features with good and bad registrations that are identified by a user. During runtime, the system may assess a plurality of data frames extracted from the scan line data, determine, whether each of the data frames possesses one or more features that correlate to a bad registration identified by a user from a training. In one embodiment, the method may, upon determining that the data frame possesses one or more features that correlate to the bad registration identified by the user from the training, exclude the data frame.

The methods for generating a 3D map in an environment illustrated in various embodiments may be implemented in a system that includes a data collecting device, one or more sensors installable on the data collecting device and a processor. The system may also include a communication interface for transmitting/receiving data to/from another device. The system may also include a mechanical drive system for moving the data collection device about the environment. In some embodiments, the one or more sensors include a laser scanner and at least one other sensor are installable on the data collection device. The data collection device may be a mobile robotic device, a robot or a device capable of collecting sensor data about an environment and can be carried by a user moving about the environment. In some embodiments, the at least one other sensor installable on the data collection device may include a camera configured to collect a sequence of images corresponding to the environment.

DETAILED DESCRIPTION

Figure 1:
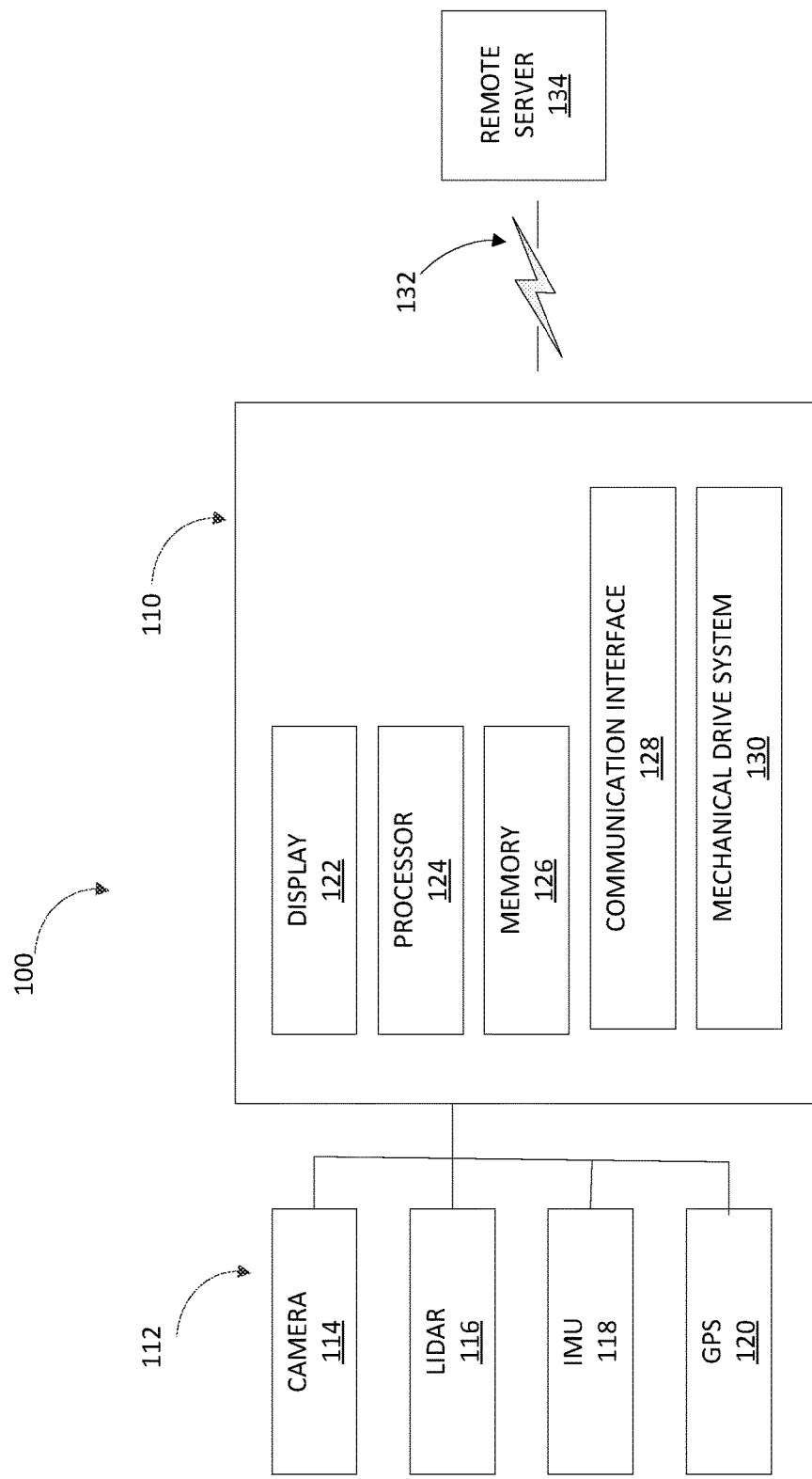
FIG. 1 depicts a diagram of a robotic system for generating a map according to one embodiment.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

The terms "memory," "computer-readable medium" and "data store" each refer to a non-transitory device on which computer-readable data, programming instructions or both are stored. Unless the context specifically states that a single device is required or that multiple devices are required, the terms "memory," "computer-readable medium" and "data store" include both the singular and plural embodiments, as well as portions of such devices such as memory sectors.

Each of the terms "camera," "video capture module," "imaging device," "image sensing device" or "imaging sensor" refers to a software application and/or the image sensing hardware of an electronic device that is capable of optically viewing a scene and converting an interpretation of that scene into electronic signals so that the interpretation is saved to a digital video file comprising a series of images.

The term "environment" refers to man-made or natural surroundings such as structures, roads, parking lots, streets, construction sites, airports, etc. Examples of a structure include a building, an internal section of a building and surroundings of a building.

The term "laser scanner" refers to a device that measures distance to a target by using a laser emit light toward the target, using a photodetector to detect laser light reflected back from the target, and calculating distance measurements based on the detected light. A laser scanner will typically include optics such as a mirror and/or beam splitter to help gather reflected light from a surface of a structure in an environment. A LiDAR system is an example of a laser scanner. In operation, a laser scanner will obtain data from multiple scans, each of which is made up of one or more scan lines. At each instance of scan, each scan line will return a data value indicating the distance between the scanner and a point on a surface of a structure in the environment. Scan line data generally refers to a collection of data from one or more scan lines. The scan line data from the laser scanner may be used to determine the relative location of the scanner to a structure in an environment and thus generate a three dimensional map of the environment. A data frame from a LiDAR sensor may include scan line data that are generated from an instance of scan.

The term "landmark" refers to a detectable objects in an environment having one or more features. Examples of a landmark include a furniture, such as sofa, a table, a wall, a structure of a building etc. in an indoor or outdoor environment.

As shown in FIG. 1, a system 100 for generating a 3D map of an environment may include a data collection device 110. A 3D map may be a collection of points in 3D that make up a map of the environment. The data collection device 110 is a device that is capable of collecting sensor data for generating a map. For example, the data collection device 110 can be part of or installed on a robotic device, such as an autonomous vehicle or a robot. Alternatively, the data collection device 110 can also be a handheld scanner that can be carried or otherwise moved by a user, such as by hand or in a backpack or on a rolling platform, while the user is moving about the environment. The system may also include one or more sensors 112 installable on the data collection device. In one embodiment, the data collection device 110 may include an interactive display or other user interface for a user to operate the system, a processor 124, a computer-readable storage medium such as a memory 126 and a communication interface 128 for transmitting/receiving data to/from another device on the network. Additionally, the data collection device 110 may be a robotic device and it may additionally include a mechanical drive system 130 for driving the robotic device to move about an environment to be mapped. The mechanical drive system 130 may include wheels for moving the robotic device, a motor for driving the wheels and other mechanical components that would enable the operating of the robotic device. The mechanical drive system 130 may include both hardware and software. For example, the software may include programming instructions residing in the memory, which will cause the mechanical drive system to operate.

According to some embodiments, the robotic device may be a mobile vehicle or an autonomous self-driving automobile, in which the mechanical drive system 130 may be a drivetrain system of the automobile that connects the transmission to the drive axles. In another embodiment, the drive system 130 may also include the automobile engine and/or transmission system. The drive system 130 may also include both hardware and/or software onboard the vehicle or software on a cloud, where the software may be downloadable to the vehicle for controlling the drivetrain of the vehicle.

The one or more sensors 112 may include a camera 114, a laser scanner, such as a LiDAR sensor 116, an inertial measurement unit (IMU) 118 and/or a global positioning system (GPS) sensor 120. In one embodiment, the LiDAR sensor may be multi-channel line scanner, such as a 16 channel line scanner made by Velodyne, which contains 16 channels scanning simultaneously, each channel may scan 360° in real-time and return (3D) distance data. Alternatively, the system may also use 32-channel or 64-channel line scanners. The camera may be a machine vision monocular camera, which has a charge coupled device (CCD) camera and outputs a sequence of images.

An IMU is an electronic device that measures and reports a body's specific force (non-gravitational force per unit mass), angular rate, and optionally the magnetic field surrounding the body, using a combination of accelerometers and gyroscopes, and/or magnetometers. In one embodiment, the IMU may be a product which uses an accelerometer, gyroscope and magnetometer to generate outputs such as acceleration, angular rate, magnetic field, ambient pressure, deltaTheta and/or deltaVelocity. The IMU may also output global positioning system (GPS) outputs such as earth-centered earth-fixed (ECEF) position and velocity, north east down (NED) velocity, coordinated universal (UTC) time, and GPS time. Alternatively, and/or additionally, the system may also include a separate GPS which may obtain GPS coordinates.

The above various sensors may be installed on the data collection device and is configured to capture sensor data while moving about the environment. For example, the data collection device 110 may be a robotic device that has a camera 114 installed thereon and that can be configured to receive sensor data from the camera 114, of which the sensor data may include a sequence of images. In another example, a robotic device 110 may be configured to receive laser sensor data, or line scan data from LiDAR sensor 116. Alternatively, the laser scanner may be manually carried or moved about an environment, and it may provide its data to a local or remote processor and computer-readable memory via a wired or wireless communication connection.

In some embodiments, the robotic device 110 may use the received sensor data, generate a 3D map of the environment by the processor 124 onboard the robotic device, and save the 3D map in the memory. In some embodiments, the system 100 may also include a communication network 132 and one or more remote servers 134. The robotic device 110 may be configured to transmit the received sensor data to a remote server 134 through the communication network 132 via the communication interface 128. The remote server may include one or more processors that can be configured to process the received sensor data, build the 3D map for the environment and save the map to a memory.

Figure 2:
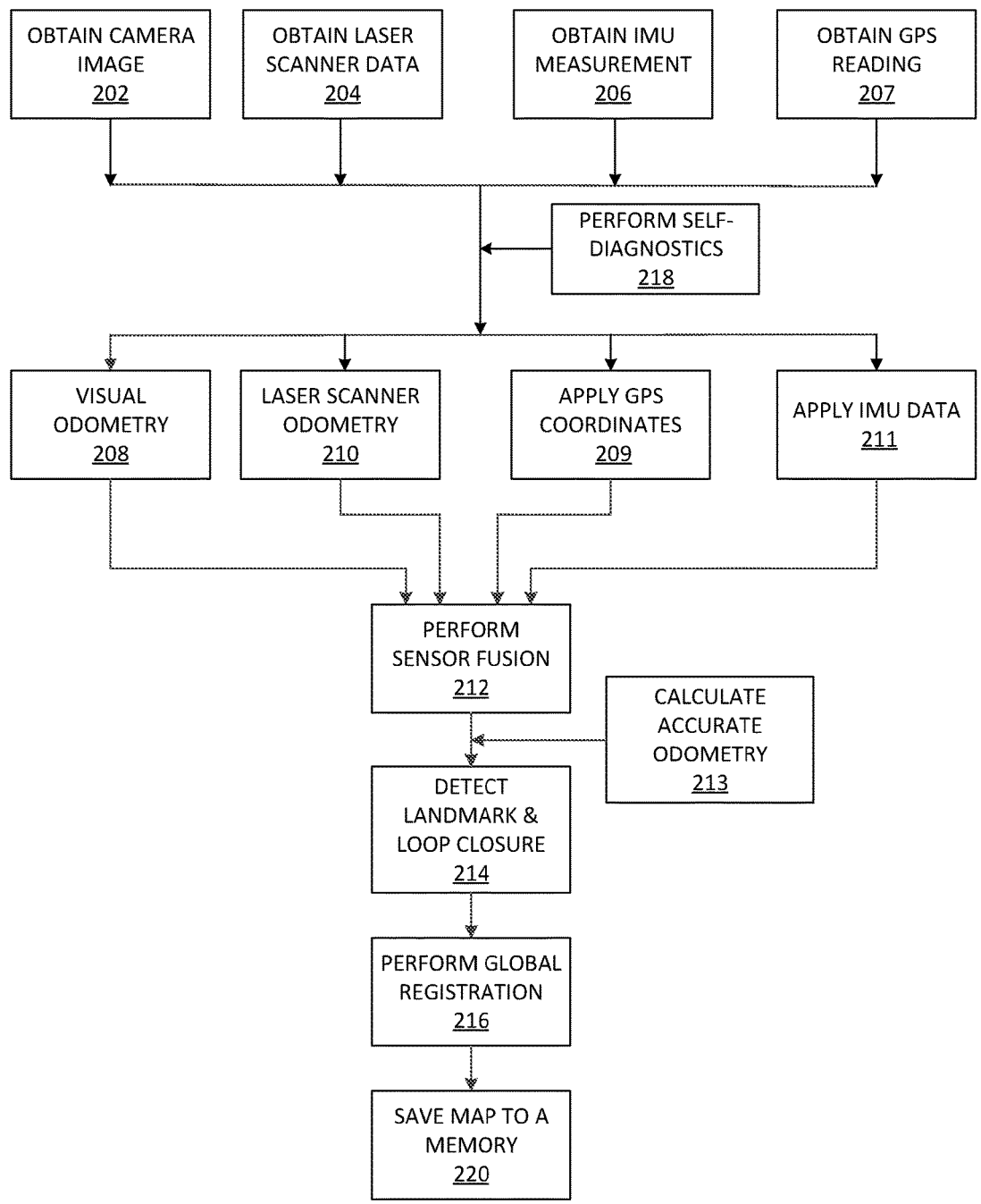
FIG. 2 depicts a diagram of a process for generating a map in a robotic system according to one embodiment.

As shown in FIG. 2, the robotic system may implement a method for generating a 3D map registration, where the method may include obtaining image data from camera 202, obtaining scan line data from a laser scanner 204 such as a LiDAR sensor, obtaining motion measurement data from an IMU 206, and obtaining GPS readings from a GPS tracking system 207. Any or all of the sensors may be installed on the robotic device, installed on a manually-movable device (such as a wheeled cart), or manually carried about the environment. For example, a human operator may carry a camera and move around the environment, instead of a robotic device moving around the environment. The method may be performed in real time by a processor that is included in the robotic system, such as a processor onboard the robotic device, or by a remote processor that receives these sensor data points from the robotic device via a communication interface.

In FIG. 2, the method may perform odometry (i.e., estimate a change in position of a sensor over time) using data such as image data 208 from the camera, laser scanner data 110 from the LiDAR sensor, GPS coordinates obtained from a GPS sensor 209, and/or raw IMU data obtained from the IMU 211. The system may fuse the results of the visual image data-based-odometry, the LiDAR data-based odometry, the GPS coordinates, and the IMU sensor data in a probabilistic sensor fusion framework 212.

Odometry refers to a process of estimating the motion (i.e. the change of position relative to a starting position) of a robotic device, such as an autonomous vehicle. Odometry in this patent application also interchangeably refers to a collection of estimated points, or a group of points or point cloud representing a sensor's motion as a result of the process of estimating the motion of the sensor. In particular, visual or camera odometry refers to a process of estimating the motion of the robotic device using one or more images from a single or multiple cameras attached to the robotic device. Visual odometry operates by incrementally estimating the pose of the robotic device through examination of the changes that motion induces on the images of its onboard cameras. Likewise, LiDAR (or other laser scanner) odometry refers to a process of estimating the motion of the robotic device from the readings of distance data from the LiDAR (laser) sensor.

For a laser scanner to operate, the laser of the sensor will emit scans, and the photoreceptor of the sensor will receive reflected scans, each of which includes one or more scan lines. Each scan line returns a data value indicating the distance between the sensor and a point on a surface of a structure, such as walls or objects in the environment. In building the visual odometry, the system also may use various images collected from one or more cameras. For the LIDAR algorithms, the system may use the scan line data to extract unique LiDAR features or feature points that correspond to, for example, sharp edges and planar surfaces of structures or objects in the environment. The system may match the feature points to edge line segments and planar surface patches, respectively.

In some embodiments, the system can be configured to perform visual image-based odometry and/or laser scanner odometry independently of the height of the camera or laser scanner. In other words, no assumption of the height of the camera or laser scanner is made. This would allow manual data collection. For example, if manual monocular camera data collection is enabled, the system may use depth registration (from LiDAR data) and/or IMU data (e.g. velocity) to calculate the monocular camera visual odometry scale, which will be further explained. In other embodiments, if sensors are installed on the robotic device and automatic data collection is enabled, the system may assume that the sensors are installed at a fixed height above the ground (e.g., the height at which the sensor is positioned on a robot). This fixed height above the ground can be used to calculate the scale of the monocular visual odometry. In some embodiments, if a stereo camera is used, the height of the camera may be optional because the scale of the odometry can be calculated using a triangulation method based on the distance between the two cameras of the stereo camera (known as the baseline). The triangulation method can be used to estimate the depth of all of the features in the environment from stereo camera images.

When performing sensor fusion, the system may initially start with one sensor-based odometry and then supplement or otherwise modify the result based on data from one or more of the other sensors. For example, in some embodiments, the system may perform odometry using laser scanner data and optimize the result using data from the camera and/or other sensors. Alternatively, the system may initially obtain the odometry based on the measurement from the IMU and further optimize the odometries by using the received data from the camera and LiDAR sensors. The system also may perform various sensor-based odometries in parallel and fuse the results. Alternatively, and/or additionally, the method may calculate an accurate overall odometry 213 from the result of sensor fusion 212.

In a parallel process, the system may process the visual image (or other sensor) data and LiDAR (or other laser scanner) data to detect landmarks and key points and loop closures in the environment 214, in which the robotic system returns to a position it has started. The method may use the same feature points that are used in building visual and LiDAR odometries. Sensor fusion also may include performing a global registration algorithm 216 that runs in a lower frequency to smooth and perfect the map. Optionally, the system may perform a self-diagnostic process 218 that monitors incoming data for problematic data instances, learns problematic cases based on past experience and adjusts the algorithms as needed. The illustrated steps will be further explained in detail below.

In performing odometry using laser scanner data 210, the system may obtain scan line data from the laser scanner, extract feature points from the scan line data, and use the feature points to identify one or more landmarks in the environment. The system may do this for various locations of the laser scanner as it is moved around the environment. To determine changes in the laser scanner's position, in some embodiments the system may use a variation of the Generalized Iterative Closest Point (GICP) algorithm. Iterative Closest Point (ICP) is an algorithm employed to minimize the difference between two clouds of points. ICP may be used to reconstruct two-dimensional (2D) or 3D surfaces from different scans, to localize robots and achieve improved path planning, especially when wheel odometry is unreliable due to slippery terrain. In the ICP algorithm, one-point cloud (corresponding to the reference or target), is kept fixed, while the other point cloud (representing the source), is transformed to best match the reference. The algorithm iteratively revises the transformation (i.e., the combination of translation and rotation) needed to minimize the distance from the source to the reference point cloud. Many ICP variants exist, including point-to-point and point-to-plane, such as what is disclosed in Pomerleau, Colas, and Siegwart, "A Review of Point Cloud Registration Algorithms for Mobile Robotics," Foundations and Trends in Robotics, 4 (1): 1-104, 2015, which is also incorporated herein by reference.

The GICP algorithm, such as what is disclosed in A. Segal, D. Haehnel and S. Thrun. Generalized-ICP. Robotics: Science and Systems Conference (RSS), Seattle, USA (2009), which is also incorporated herein by reference, assumes local planarity of the environment, which would be a reasonable assumption for man-made environments such as construction sites, and minimizes the distances between points from one scan to the planes in the other along the surface normal of the planes. The optimization step is formulated as a maximum likelihood estimation which considers the covariance of the distribution of the points. This allows considering the uncertainty explicitly in the algorithm. An example of an optimization process using the GICP algorithm is further illustrated in FIGS. 3A and 3B.

Figure 3A:
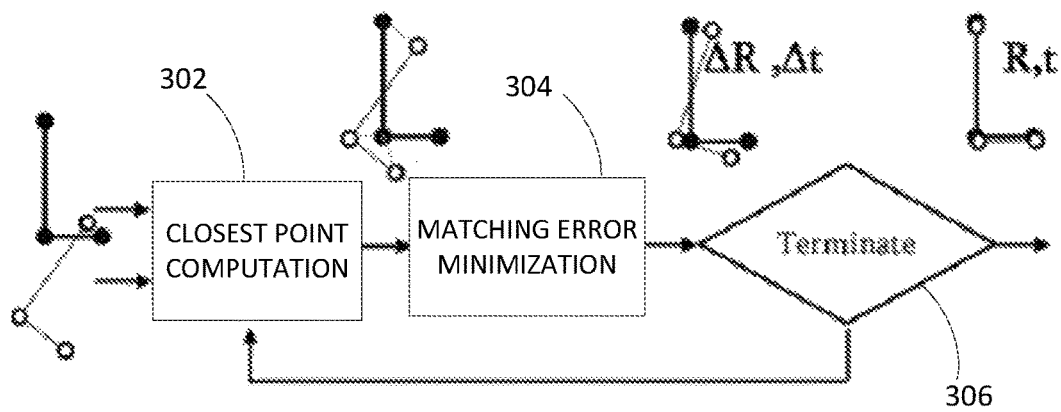
FIGS. 3A-3B depict a diagram of examples of processing steps in an ICP or GICP algorithm.
Figure 3B:
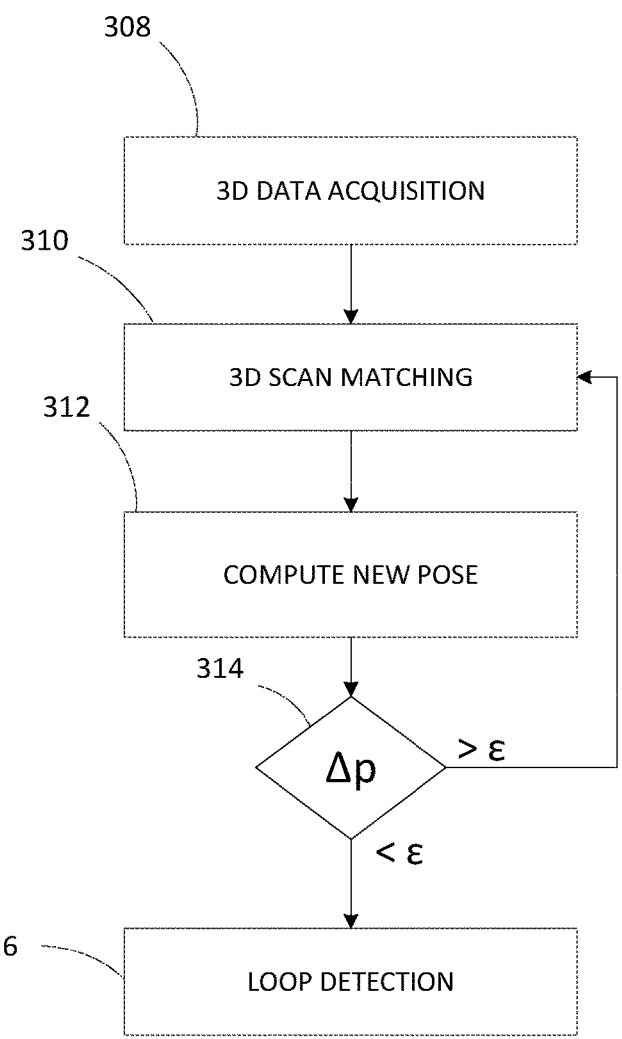

As shown in FIG. 3A, the GICP algorithm may include closest point computation 302 and matching error minimization 304, and repeating the steps of 302 and 304 until a convergence is achieved, at which point the algorithm terminates 306. As shown in FIG. 3B, the GICP algorithm may also include 3D data acquisition 308 (e.g, acquiring scan line data from the laser scanner and extracting feature points from the scan line data), 3D scan matching 310 (i.e., matching feature points from a particular scan with feature points found in a window of one or more scan lines immediately before or immediately after the particular scan), new pose computation 312, and an iterative process 314 to determine when the process ends. As will be described throughout this patent document, the mapping system 100 (in FIG. 1) will include various improvements over the GICP algorithm.

According to some embodiments, in performing the odometry of laser scanner data, the system may improve the GICP framework in several ways to optimize the algorithm for speed and accuracy. In GICP and in some ICP variants, proper selection of and matching of points and accurate calculation of optimization parameters are critical, yet there is a need in the GICP to obtain more accurate matching points and minimize matching errors (302, 604 in FIG. 3A and 310, 312 in FIG. 3B). For example, a KD-tree search, which returns the nearest N points or points within a selected radius cannot guarantee returning points that are on a single plane. Additionally, it is nearly impossible to select a single tree search parameter to register accurately when objects in the environment have high variability in range, due to divergence of laser beams. This causes incorrect rotation and translation drifts.

To address the above issues, in some embodiments, in forming a plane, the system may determine or search for points that form a plane explicitly from different scan lines by performing a local curvature check to eliminate points that cross plane boundaries from the current search (i.e., points beyond a corner point). This allows for selecting points that result in accurate calculation of normal surfaces, even around the surface boundaries, and thus helps eliminate drifting issues. Subsequently, the system may find better matches in the matching step by explicitly using normal surfaces.

In other embodiments, the system may replace the GICP's radius search with a custom algorithm. For example, for each scan, the system may adjust the number of points and look for a small number of points in a subset of scans, such as the next and previous two scans, that support the point of interest. For example, for each instance of the LiDAR scan, the system may find one or more matching points. A matching point is a point in a current instance of a scan that matches a point obtained from a scan line in an adjacent window of scans. In various embodiments, the window of scans may include scan lines from one or more scans occurring immediately before and/or after the instance of the scan, e.g. two scan lines from the previous instance and two scan lines from the next instance of the scan. This may result in a significant saving of computation time as compared to the radius-based search because of fewer scan lines required.

In an embodiment, for each instance of the scans of the laser scanner, the system may identify a window that includes scan lines from one or more scans occurring immediately before or after the instance of the scan, identify one or more matching points from the one or more feature points extracted from the scan line data corresponding to one or more scans occurring immediately before or after the instance of the scan, and adjust the number of matching points based on a distance of the laser scanner to each of the matching points. For example, the system may select the points from each scan such that no points beyond the nearest sharp point are selected. Using fewer points can ensure that smaller planes that indicate rotations can also be used, which would help avoiding jumps during the first couple of frames of rotations. In some embodiments, the system may select more points as the distance from the scanner increases, because otherwise where it is far away from the scanner, the normals calculated from the selected points can become unreliable (e.g., on a line). Alternatively, and/or additionally, the system may also verify the selected points and reject improper points that do not form a plane properly, based on their surface normals. In an experiment, the system reduced translational error to less than 1.00% for about 800 meter of operating distance and the rotational error to less than 0.002 degrees/meter, an improvement over the prior art systems. The details of the GICP-based approach are further described below.

In some embodiments, the system may build LiDAR odometry across multiple frames, in two phases: (i) immediate ICP; and (ii) trajectory optimization. In the immediate ICP phase, the system may use the current and previous full point cloud (through a voxel filter with very small leaf size) to run the ICP algorithm to generate an initial estimate for the second phase of algorithm. In this phase, the system may also use IMU odometry as the initial estimate.

In some embodiments, for both the immediate ICP step and trajectory optimization, the system may vary the number of neighbors to search and epsilon values for tuning the data (refer to step 314 in FIG. 3B) so that the system may use a fewer number of points. This makes it possible for the system to look for point matching in more than two scan frames as conventionally done. Doing this will help in cases where there aren't many unique features to extract from two consecutive frames (for example, a change in environments from indoor to outdoor or any featureless environments).

In some embodiments, the system may perform both global and local optimization (i.e. SLAM back-end optimization, which is not available in the GICP algorithm). This will be further explained with reference to the trajectory optimization step. In the trajectory optimization phase, the system may run a trajectory optimization algorithm (also known as local trajectory optimization) with at most N recent points in the point cloud. In one embodiment, the system may choose the value of N based on a lifetime of a typical point in the real world inside received frames. For example, if N features are seen in 5 previous frames in the real world, the system may determine to match the features in the previous 5 frames to the current frame. The examination of multiple frames is now feasible because fewer features than that in a typical ICP algorithms are used. In an extreme case, increasing N to infinity is equivalent to a global optimization algorithm.

The details of trajectory optimization are now further described. In one embodiment, the system does not use full clouds, but instead may extract landmarks and transform them based on initial odometry estimation from the ICP. In particular, in each scan window, the system may find landmarks, extract descriptors and match the descriptors with other landmarks within the window. The system may find explicit matchings and use them for graph optimization. Examples of graph optimization include general graph optimization (G2O) and Gauss-Schneider-based graph algorithms. One challenge in this process is that the LiDAR data is spaced along the projective lines and the density is not uniform. To address this issue, in some embodiments, the system will not extract point based features from the same location, and the details of the trajectory optimization are further described with reference to FIG. 4.

Figure 4:
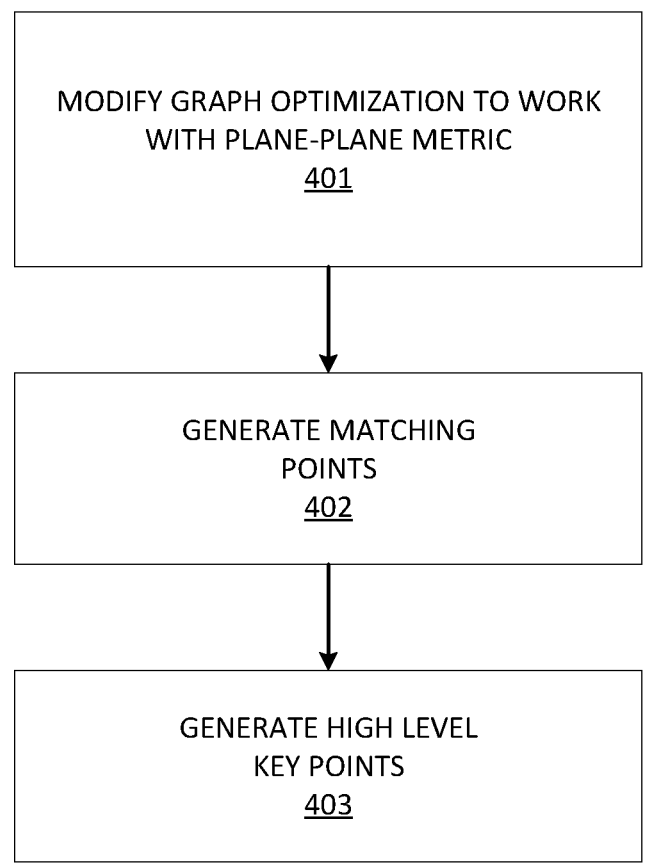
FIG. 4 depicts a diagram of LiDAR odometry according to one embodiment.

In FIG. 4, the system may modify graph optimization equations to work with plane-plane metric 401, use sample surfaces to generate matching points 402 and feed a graph optimization algorithm based on point-landmarks, and generate more persistent high level key-points (in terms of location like plane intersections, corners etc.) 403. To modify the graph optimization equations 401, the system may calculate covariance using planar, sharp features and the full point cloud, match them with Euclidian distance and feed them to the optimization step of GICP with multiple poses.

Alternatively, the system may also modify Lu and Milios style SLAM (LUM) equations with the plane-to-plane equations from GICP. LUM is a six-degree (6D) graph optimization algorithm for global relaxation, the teachings of which can be referred to Borrmann et al., "Globally Consistent 3D Mapping with Scan Matching," Journal of Robotics and Autonomous Systems, 2007, which is also incorporated herein by reference. The basic properties of 6D LUM are: 1) Data point correspondences are made by a hard decision using 'nearest neighbor' point correspondences; 2) 6D LUM computes the minimum in every iteration; and 3) 6D LUM transforms all scans simultaneously.

To generate matching points 402, the system may match a point obtained from scan lines to one of existing landmarks. The existing landmarks may be pre-extracted and stored in a data structure used to represent a collection of multi-dimensional points (e.g., in 3D or four-dimensional with color). An example of such data structure is a point cloud. In some embodiments, the system may use a LiDAR based features, such as using a feature extractor with strict parameters such as fast point feature histograms descriptors (FPFH), match them with descriptors in combination with Euclidian distance and use projection algorithms to sample exact points from the extracted landmarks, and finally feed them to the graph algorithm. In one embodiment, the feature extractor can be known technologies such as those available in a Point Cloud Library (PCL). In generating higher level key-points 403, the system may further impose constraints on landmark extraction to find wall corners or shape features and use them directly.

The illustrated algorithm in this phase is an instance of the loop closure methods detailed above. In particular, if a start-end loop closure is detected, the system may explicitly add this constraint to the graph optimization (since start-end constraint might be very high relative to other pose constraints). In a LUM algorithm, the system may remove the initial pose from the free poses, extend the algorithm by adding the final transformation to a zero pose, and fixing the first and final pose constraints.

According to one embodiment, the system may also detect intermediate loop closure (if exists) with a higher level place recognition algorithm. This refers to a scenario in which there are multiple loops. Intermediate loop refers to loop that is formed by any two frames between the starting and ending frame and not necessarily the first and the last frame. The system may detect intermediate loop closures using a combination of feature matching and Euclidian distance, as explained above with reference to 202 (in FIG. 4).

Returning to FIG. 2, in performing the visual odometry 208, existing algorithms have been developed for reconstructing 3D maps from camera imagery. However, using just one camera is a more complex problem because the depth of observed features in the image is unknown and multi-view geometry is necessary to solve the problem. Further, existing systems generally rely on color descriptors, markers placed at specific location within the environment, or existing CAD models of the environment. This, however, will increase the computation time needed to build the visual odometry. To address this issue, in some embodiments, the system may use image based features such as Oriented FAST (Features from accelerated segment test) and rotated binary robust independent element features (BRIEF) or ORB features (see Rublee et al., "ORB: an efficient alternative to SIFT or SURF," IEEE International Conference on Computer Vision (ICCV), 2011, which is also incorporated herein by reference). This allows the system to quickly detect and efficiently track and match between multiple camera frames.

The ORB is a technique that uses a fusion of FAST key-point detector and BRIEF descriptor (see Calonder et al., "Brief: Binary robust independent elementary features," Computer Vision-ECCV, Springer Berlin Heidelberg, 778-792, 2010, which is also incorporated herein by reference) with modifications to enhance the performance, and an implementation is available in OpenCV (http://docs.opencv.org). FAST is a corner detection method, which could be used to extract feature points and later used to track and map objects in many computer vision tasks. FAST corner detector was originally developed by Edward Rosten and Tom Drummond, and published in 2006. A promising advantage of the FAST corner detector is its computational efficiency (see Rosten and Drummond, "Fusing points and lines for high performance tracking," IEEE International Conference on Computer Vision, 2: 1508-1511, 2005, which is also incorporated herein by reference).

In some embodiments, in tracking a sequence of images captured from a camera, the system may perform feature matching to estimate the new camera pose with respect to triangulated points in the previous key frame. After each pose estimation, the system checks the quality of tracking and decide whether to insert a new key frame or to continue tracking. If the quality of tracking is lower than a threshold, the system triangulates a new set of points and records a new key frame.

Additionally, and/or alternatively, the system may perform relocalization in case of tracking failure and loop closing with a high invariance to viewpoint in real time. The system may store all the extracted features (this is done by using a Bag of Words) matched to their exact timestamp. In case of tracking failure the system may extract features from the current unknown frame and try to match it with the stored feature set. If there is a match (when at least a certain threshold of matched features exist), then the system can successfully relocalize the pose. In order to reduce the expensive batch operation to real-time operations, the system may run these operations: tracking, mapping and loop closure in multi threads.

Returning to FIG. 2, in sensor fusion 212, the system may utilize probabilistic sensor fusion frameworks, such as disclosed in Elmenreich, "Sensor Fusion in Time-Triggered Systems," PhD Thesis, Vienna, Austria: Vienna University of Technology. p. 173 (2002), which is also incorporated herein by reference, and which can explicitly represent and track measurement and process uncertainties to combine LiDAR, camera, and inertial measurements. This will overcome the deficiency and particular challenge of recovering the scale accurately from visual odometry, in which camera-based reconstruction alone suffers from sensitivity to illumination and feature deficiency of the environment. In one embodiment, the system may perform sensor fusion 212 by combining various sensor modalities in an efficient manner to compensate for each sensor's deficiencies in order to generate a high-quality reconstruction. The system may also use the GPS data for outdoor operations to supply additional localization information.

In various embodiments, the system may calculate visual odometry scale, including scaling by other sensor odometries, multi-sensor fusion, structure from motion techniques, and depth registration. For example, the system may use the overlap between the LiDAR and the camera to obtain depth registration for scale estimation. In addition, the system may incorporate various methods to recover the scale accurately. For example, the system may use the least square optimization technique to recover the scale by matching splines calculated using data from camera odometry and the IMU. In one embodiment, the system may incorporate any reasonably close scale value generated from least square optimization into an Extended Kalman Filter (EKF) as an additional parameter to fuse the data and estimate the position of the robotic device along with the final odometry. Whereas using EKF filter for state estimation is an existing approach, the sensor fusion technique described above is not. The sensor fusion is unique for each problem, and the system described in this patent application provides advantageous over existing approaches by using the IMU data as the initial estimate for the LIDAR odometry and also feeding in the raw IMU data to the sensor fusion filter directly (refer to FIG. 2).

In using the EKF filter, the system may send the output of trajectory optimization instead of the immediate odometry to the EKF filter. As the introduction of trajectory optimization might introduce "jumps" in the odometry, and trajectory optimization odometry and visual odometry might diverge. To address this issue, the system may first check the simple EKF integration solution but, also consider multi-modal EKF or nonparametric particle filters. As described above, if there is divergence between the optimized odometry and the camera odometry, then the system may first combine the camera odometry and the IMU data through a noise filter, then combine the result with the optimized odometry, which will pass through another filter for final sensor fusion. In either case, IMU is still being used as control input (instead of update) and others as updating observations.

With further reference to FIG. 2, in one embodiment, the system may optionally perform self-diagnosis and self-adjustment 218 to detect any problems with the data obtained from the sensors, for example, potentially problematic data frames from the LiDAR and the camera. Existing techniques, such as eigen analysis of LiDAR frames and histograms of spatial data distribution, can be used. Additionally, the system may extract fitness scores or low level numbers to detect potential problems. These values provide insight into the inner workings of the algorithms, however they cannot tell how and why the algorithm might fail. To address this issue, in some embodiments, the system may differentiate "bad" regions from good regions by training one or more models on locally extracted features, such as 3D spatial distribution of data, Euclidean distribution of points, and several other features. The trained model may correlate these features with good and bad registrations that are identified by a user.

In some embodiments, during training, the indication of a particular registration as "bad" or "good" may be received via user input, and the system may apply a suitable supervised machine learning method to train the model. In some embodiments, during runtime or data collection, when data frames are captured, the system may use the trained model, or these correlations obtained from the training to detect data frames that have the features that correlate to the those registrations that were identified as "bad" during training, and identify these data as bad data frames or having potential problems. In some embodiments, if the system determines that a data frame is a bad data frame or has potential problems, the system may exclude the identified bad data frame from further processing.

Alternatively, and/or additionally, the system may select parameters for various algorithms during the run time in order to reduce computation time. For example, when the algorithm transitions to processing indoor data characterized by smaller planar regions, limited maximum range, and denser data, the LiDAR odometry algorithm can be adjusted to reduce the number of points used for matching to improve performance. Similarly, in sensor fusion (212 in FIG. 2), for regions that are characterized as not having adequate features for visual odometry, the system may be configured to trust more (i.e., give more weight to) on the LiDAR odometry and inertial measurements.

With further reference to FIG. 2, map reconstruction is very sensitive to error accumulation. If allowed to accumulate, local registration errors can spread throughout the entire map and cause significant drifts. Extreme cases can occur, for example, when a user wants to capture areas that are loosely connected to the rest of the environment. For example, when the operation of a robot involves a transition from indoor to outdoor environment, the odometry algorithm can be expected to lose tracking and cause drifts. Additionally, size of the areas that will be traversed by the robot will be several orders of magnitude larger than what is considered as the norm right now, which increases the risk of significant drifting. Thus, local drifts caused by incorrect tracking and accumulation of errors have to be isolated and residual errors resulting from poor local registrations should not be allowed to spread to the global map. In some embodiments, the system addresses the problem of drifting errors with the landmark detection and loop closure technique 114 (in FIG. 2), which uses both the camera and the LiDAR data. This is further explained with reference to FIG. 5.

Figure 5:
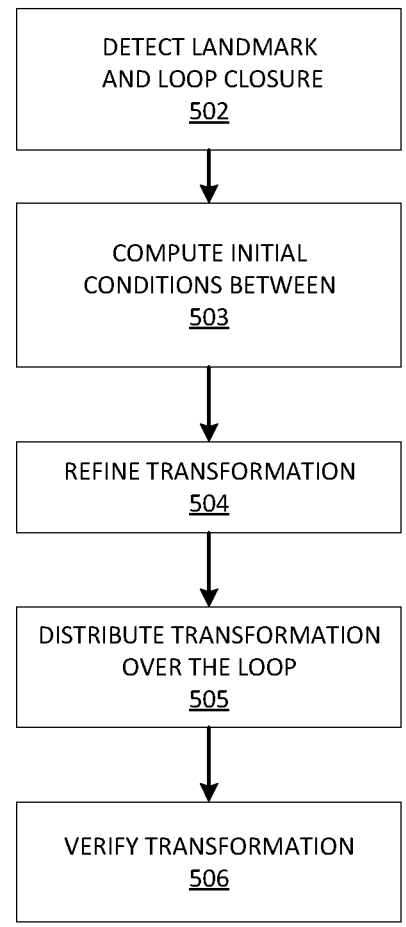
FIG. 5 depicts an example of using landmark and loop closure detection according to one embodiment.

In FIG. 5, the system may detect landmarks 202 by detecting them from camera images. A landmark is a collection of one or more detected features, such as a corner of a wall, an item of furniture, or a door. The system may detect landmarks in various ways, such as for example, by using a bag of words method, in which image features are treated as words, and the bag of words is a vector of the occurrence of counts of words that correspond to various image features (see "Bags of Binary Words for Fast Place Recognition in Image Sequences," IEEE Transactions on Robotics, vol. 28, no. 5, pp. 1188-1197, October 2012, which is also incorporated herein by reference). Similarly, the system may extract LiDAR key-point features and use them to generate a dictionary of places the device has visited before. These key points are the same key points that are used for tracking in LIDAR odometry. The dictionary is a database of stored features along with their timestamped frames, in which the features are extracted.

In detecting landmarks, some existing techniques assume association using Euclidean distance between frames, however, they are not applicable to the present system. As associations are unknown, the scans may be grossly warped after local registration which would invalidate any Euclidean based association metric, unless one is simultaneously running a global optimization alongside the local registration. In some embodiments, the system assumes that it needs to explicitly detect landmarks, extract landmarks and descriptors, and match them based on a combination of Euclidian distance and descriptors.

In some embodiments, the system may detect the landmarks using the camera and the LIDAR, and once the landmark in the first initial frame and that in the current frame match (i.e., the matched features are above a certain threshold and Euclidean distance), the system may calculate a final transform between the two frames, for example, by using the modified GICP algorithm described above or algorithms like LUM. In one embodiment, the system may minimize the drift error in the calculated final transform by distributing the errors back to all the poses in the odometry based on their covariances. For example, the system may distribute the errors equally to all the poses of the odometry.

With the landmark detection and loop closure, the system will produce good odometries that can be used for map registration, which will be further explained.

With further reference to FIG. 5, in some embodiments, the system may monitor the location of the robotic system and when the robotic device comes back to the same place that it has visited before, the system may compute initial conditions 503, estimate the transform between the landmarks observed by the sensors 504, distribute the transform throughout the trajectories that connect the loop ends 505 and verify transformation 506. These steps are further explained as below.

In computing initial conditions 503, the system may calculate the transformation between the detected loop frames. However, in order to recover from large difference between two frames introduced by large drift accumulations over long paths, the system may use gradient-independent optimization such as genetic algorithms to get close to the global solution as fast as possible. A refinement can then be applied to the improved initial conditions in 504. This refinement helps to speed up the graph based global optimization and thus the system can close the loop (or minimize the error) faster.

In some embodiments, the system may also verify transform 506 to determine the quality of the resulting maps. In one embodiment, the system may use low-level metrics such as feature matching results and fitness scores after running the algorithm on the frames. Alternatively, and/or additionally, the system may calculate the correlation between two frames by binning (histogram) two clouds and calculating the match between the two histograms. The system may determine that the correlation between two frames is 1 if there is an exact match; and 0 otherwise. Alternatively, and/or additionally, the system may also calculate the complexity of a cloud, e.g., by calculating the local surface normals of the cloud and by finding the eigenvectors of the surface normals. If the ratio of the eigenvectors about 1, the system may determine that the cloud is a complex cloud (e.g., not a featureless straight hallway); and not complex otherwise. The advantages of using the complexity metric to determine the quality of the map is that it is independent of the registration algorithm.

Up until now, the various steps described above are all considered part of odometry, which generates a rough position estimation and undistorts the clouds. In one embodiment, the system may perform these calculations while registering the clouds 216 (in FIG. 2) simultaneously (performing SLAM). The system may further perform a high accuracy matching and generate a final smooth map using the optimization techniques discussed above. Particularly, with further reference to FIG. 2, the system performs map registration through a global registration framework, under which the system matches the features that are extracted from the camera and the LiDAR to their respective key points globally and optimizes over multiple frames or over the entire trajectory to minimize the distance between key points. In some embodiments, the optimization can be formulated as a graph-optimization problem, and the system may perform the optimization through graph optimization. In some embodiments, the system may use the GICP in the same way as in performing the LiDAR odometry (210 in FIG. 2), but with a lot more points that run the algorithm with a lower frequency. For example, usually the mapping frequency is 1/10th times the odometry frequency, e.g., 1 Hz for mapping vs. 10 Hz for odometry. The order of frequency_odometry and frequency_mapping depends on how long each algorithm takes to converge and how many jumps the different frequencies cause.

As shown in FIG. 2, the system will save the map to a memory 220. In one embodiment, the system may perform the map registration 216 by a processor onboard the robotic device and also save the map to a memory onboard the robotic device. The system may also save the map to a removable media that is connected to the robotic device. Alternatively, and/or additionally, the system may perform the map registration by a process onboard the robotic device and transmit the map to a remote server on the communication network. The system may also perform the map registration by a processor on a cloud-based data storage facility and save the map to a memory on the cloud-based storage facility so that it can be retrieved by other applications or systems.

Figure 6:
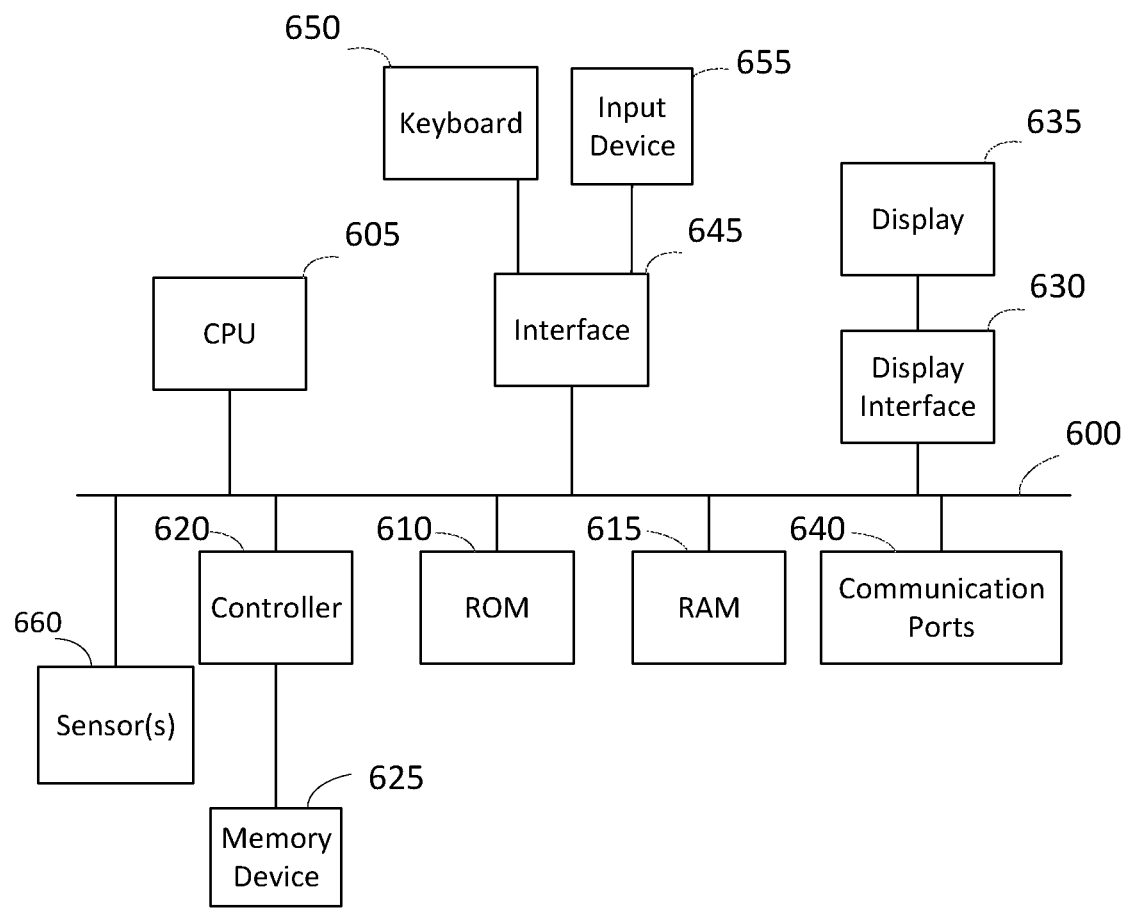
FIG. 6 depicts various embodiments of one or more electronic devices for implementing the various methods and processes described herein.

The various embodiments illustrated above will enhance the existing methods for better accuracy and performance. FIG. 6 depicts an example of internal hardware that may be included in the robotic system, which may implement various methods in the embodiments described in FIGS. 1-5. An electrical bus 200 serves as an information highway interconnecting the other illustrated components of the hardware. Processor 205 is a central processing device of the system, configured to perform calculations and logic operations required to execute programming instructions. As used in this document and in the claims, the terms "processor" and "processing device" may refer to a single processor or any number of processors in a set of processors that collectively perform a process, whether a central processing unit (CPU) or a graphics processing unit (GPU) or a combination of the two. Read only memory (ROM), random access memory (RAM), flash memory, hard drives and other devices capable of storing electronic data constitute examples of memory devices 625. A memory device, also referred to as a computer-readable medium, may include a single device or a collection of devices across which data and/or instructions are stored.

An optional display interface 630 may permit information from the bus 600 to be displayed on a display device 635 in visual, graphic or alphanumeric format. An audio interface and audio output (such as a speaker) also may be provided. Communication with external devices may occur using various communication devices 640 such as a transmitter and/or receiver, antenna, an RFID tag and/or short-range or near-field communication circuitry. A communication device 640 may be attached to a communications network, such as the Internet, a local area network or a cellular telephone data network.

The hardware may also include a user interface sensor 645 that allows for receipt of data from input devices 650 such as a keyboard, a mouse, a joystick, a touchscreen, a remote control, a pointing device, a video input device and/or an audio input device. Digital image frames also may be received from an imaging capturing device 655 such as a video or camera installed on a moving robotic device. Other environmental sensors 660, such as a LiDAR sensor, a GPS system and/or an IMU sensor, may be installed on the moving robotic device and communicatively accessible by the processor 605, either directly (if the processor is part of the robotic device) or via the communication device 640 (if the processor is remote from the robotic device). In other embodiments, the various sensors may be equipped with a communication interface and software such that the readings of the sensors can be remotely accessible by a processor. For example, a LiDAR sensor may have a built-in HTTP server that allows access by a remote server.

Optionally, the hardware may not need to include a memory, but instead programming instructions are running on one or more virtual machines or one or more containers on a cloud. For example, the various steps in registering a map as described in FIG. 2 may be implemented by a server on a cloud that includes multiple virtual machines, each virtual machine having an operating system, a virtual disk, virtual network and applications, and the programming instructions for implementing various functions in the robotic system may be stored on one or more of those virtual machines on the cloud.

Various embodiments described above may be implemented and adapted to various applications. For example, the mapping system 100 (in FIG. 1) may be a mobile robot or a robotic vehicle such as an autonomous self-driving vehicle or an aerial drone. The robotic vehicle can be configured to drive or fly around various environments and build 3D maps about the environments. The robotic system may also be a mobile robot or robotic vehicle used in real estate market for building 3D maps of the dwellings or structures in residential or commercial areas. The robotic system may also be used in the construction industry for building 3D maps around construction sites. The robotic system may also be used in security surveillance applications for building 3D maps in public places such as airports or government buildings. These are only examples of applications that the robotic system described above can be used.

The above-disclosed features and functions, as well as alternatives, may be combined into many other different systems or applications. Various presently unforeseen or unanticipated alternatives, modifications, all combinations of above illustrated embodiments, variations or improvements, as may be made by those skilled in the art, are also intended to be encompassed by the disclosed embodiments. All of the cited references above are also incorporated by reference in this document.

The invention claimed is:

1. A method of constructing a three-dimensional map of an environment, comprising:
   by a laser scanner, moving about an environment and collecting scan line data from a plurality of scans of the environment, wherein each of the scans comprises one or more scan lines, each returning a data value indicating a distance between the laser scanner and a point on a surface of a structure in the environment;
   by at least one other sensor, moving about the environment with the laser scanner and collecting additional sensor data corresponding to the environment; and
   by a processor:
      obtaining the scan line data from the laser scanner,
      extracting one or more feature points from the scan line data,
      developing a laser scanner-based odometry from the feature points by:
         for each instance of the scans of the laser scanner, identifying a window that comprises scan lines from one or more scans occurring immediately before or after the instance of the scan,
         identifying a plurality of matching points from the one or more feature points extracted from the scan line data corresponding to one or more scans occurring immediately before or after the instance of the scan;
         adjusting the number of matching points based on a distance of the laser scanner to each of the plurality of matching points, and
         estimating a change in position of the laser scanner based on the adjusted number of matching points,
      obtaining the additional sensor data from the at least one other sensor, and developing an additional odometry of the environment from the additional sensor data,
      performing sensor fusion to supplement the laser scanner-based odometry with the additional odometry to develop a three-dimensional map of the environment, and
      saving the three-dimensional map to a memory device.

2. The method of claim 1, wherein developing the laser scanner-based odometry from the scan line data comprises using an iterative closest point (ICP) algorithm to estimate the change in position of the laser scanner by:
   using an Extended Kalman Filter (EKF) to estimate the change in position of the laser scanner based on the adjusted number of matching points.

3. The method of claim 1, wherein developing the three-dimensional map of the environment further comprises performing map registration through a global registration framework.

4. The method of claim 1, wherein identifying the plurality of matching points from the one or more feature points comprises, for each feature point:
   extracting a feature descriptor for the feature point; and
   determining whether the feature point corresponds to a landmark by matching the feature point to a point of a collection of feature points based on an Euclidian distance therebetween and the feature descriptor of the point.

5. The method of claim 4, wherein the feature descriptor comprises one or more LiDAR based features.

6. The method of claim 1, wherein identifying the plurality of matching points comprises:
   evaluating a curvature of each of the one or more feature points to determine whether the feature point is beyond a corner point; and
   excluding the point from being a matching point if the feature point is determined to be beyond a corner point.

7. The method of claim 1, wherein the at least one other sensor comprises a camera, and the method further comprises obtaining a sequence of images from the camera;
   wherein:
      the additional odometry is a camera odometry; and
      developing the additional odometry comprises identifying a plurality of matching points by finding one or more additional feature points in the sequence of images within the identified window.

8. The method of claim 7, further comprises determining a scale for scaling the camera odometry by:
   using a depth registration between the scan line data from the laser scanner and the sequence of images from the camera; or
   using data obtained from an inertial measurement unit (IMU).

9. The method of claim 7, wherein identifying the plurality of matching points in the camera odometry comprises, for each of the one or more additional feature points:
   extracting a feature descriptor for the additional feature point; and
   determining whether the additional feature point corresponds to a landmark by matching the additional feature point to a point of a collection of feature points based on an Euclidian distance therebetween and the feature descriptor of the point.

10. The method of claim 9, wherein the feature descriptor comprises one or more image based features.

11. The method of claim 1, wherein developing the laser scanner-based odometry from the scan line data using the iterative closest point (ICP) algorithm comprises, for each instance of the scans from the laser scanner:
obtaining a first set of points from the instance of the scan and a second set of points from one or more previous scans of the laser scanner;
using the first and second set of points to estimate a first change in position of the laser scanner;
obtaining a third set of points comprising a number of most recent points from the laser scanner;
determining the laser scanner-based odometry based on the estimated first change in position and the third set of points; and
optimizing the odometry using a graph optimization process.

12. The method of claim 11, where the graph optimization process comprises a general graph optimization (G2O) or Gauss-Schneider-based graph.

13. A system for constructing a three-dimensional map of an environment, comprising:
a laser scanner movable about an environment and configured to collect scan line data from a plurality of scans of the environment, wherein each of the scans comprises one or more scan lines, each returning a data value indicating a distance between the laser scanner and a point on a surface of a structure in the environment;
at least one other sensor movable about the environment with the laser scanner and configured collect additional sensor data corresponding to the environment;
a processor; and
a non-transitory computer-readable storage medium containing programming instructions configured to cause the processor to:
obtain the scan line data from the laser scanner,
extract one or more feature points from the scan line data,
develop a laser scanner-based odometry from the feature points by:
for each instance of the scans of the laser scanner, identifying a window that comprises scan lines from one or more scans occurring immediately before or after the instance of the scan,
identifying a plurality of matching points from the one or more feature points extracted from the scan line data corresponding to one or more scans occurring immediately before or after the instance of the scan,
adjusting the number of matching points based on a distance of the laser scanner to each of the plurality of matching points, and
estimating a change in position of the laser scanner based on the adjusted number of matching points,
obtain the additional sensor data from the at least one other sensor, and develop an additional odometry of the environment from the additional sensor data,
perform sensor fusion to supplement the laser scanner-based odometry with the additional odometry to develop a three-dimensional map of the environment, and
save the three-dimensional map to a memory device.

14. The system of claim 13, wherein the programming instructions for developing the laser scanner-based odometry comprise programming instructions configured to cause the processor to use an iterative closest point (ICP) algorithm to estimate the change in position of the laser scanner based on the scan line data and the plurality of landmarks by:
using an Extended Kalman Filter (EKF) to estimate the change in position of the laser scanner based on the adjusted number of matching points.

15. The system of claim 13, wherein the programming instructions for developing the three-dimensional map of the environment comprise programming instructions configured to cause the processor to perform map registration through a global registration framework.

16. The system of claim 13, wherein the laser scanner and the at least one other sensor are installed on a robotic device.

17. The system of claim 13, wherein the programming instructions for identifying the plurality of matching points from the one or more feature points comprise programming instructions configured to cause the processor to:
for each feature point:
extract a feature descriptor for the feature point; and
determine whether the feature point corresponds to a landmark by matching the feature point to a point of a collection of feature points based on an Euclidian distance therebetween and the feature descriptor of the point.

18. The system of claim 13, wherein the programming instructions for identifying the plurality of matching points from the one or more feature points comprise programming instructions configured to cause the processor to:
evaluate a curvature of each of the one or more feature points to determine whether the feature point is beyond a corner point; and
exclude the point from being a matching point if the feature point is determined to be beyond a corner point.

19. The system of claim 13, wherein the at least one other sensor comprises a camera, and the programming instructions comprise additional programming instructions configured to cause the processor to obtain a sequence of images from the camera;
wherein:
the additional odometry is a camera odometry; and
developing the additional odometry comprises identifying a plurality of matching points by finding one or more additional feature points in the sequence of images within the identified window.

20. The system of claim 19, wherein the programming instructions comprise additional programming instructions configured to cause the processor to determine a scale for scaling the camera odometry by:
using a depth registration between the scan line data from the laser scanner and the sequence of images from the camera; or
using data obtained from an inertial measurement unit (IMU).

21. The system of claim 19, wherein the programming instructions for identifying the plurality of matching points in the camera odometry comprise programming instructions configured to cause the processor to:
for each of the one or more additional feature points:
extract a feature descriptor for the additional feature point; and
determine whether the additional feature point corresponds to a landmark by matching the additional feature point to a point of a collection of feature points based on an Euclidian distance therebetween and the feature descriptor of the point.

22. The system of claim 13, wherein the programming instructions for developing the laser scanner-based odometry using the iterative closest point (ICP) algorithm from the scan line data comprise programming instructions configured to cause the processor to, for each instance of the scans from the laser scanner:

obtain a first set of points from the instance of the scan and a second set of points from one or more previous scans of the laser scanner;

use the first and second set of points to estimate a first change in position of the laser scanner;

obtain a third set of points comprising a number of most recent points from the laser scanner;

determine the laser scanner-based odometry based on the estimated first change in position and the third set of points; and optimize the odometry using a graph optimization process.

23. The system of claim 13, wherein:

the at least one other sensor comprises an inertial measurement unit (IMU); and the programming instructions for using the ICP to estimate the changes in position comprise programming instructions configured to cause the processor to use measurements from the IMU to determine an initial estimate of a position of a device holding the laser scanner and the IMU.

24. A system for constructing a three-dimensional map of an environment, comprising:

a robotic device movable about an environment, wherein the robotic device comprises:

a laser scanner installed thereon and configured to collect scan line data from a plurality of scans of the environment, wherein each of the scans comprises one or more scan lines, each returning a data value indicating a distance between the laser scanner and a point on a surface of a structure in the environment, and a camera installed thereon with the laser scanner and configured to collect a sequence of images corresponding to the environment;

a processor; and a non-transitory computer-readable storage medium containing programming instructions configured to cause the processor to:

obtain the scan line data from the laser scanner, extract one or more feature points from the scan line data, develop a laser scanner-based odometry from the feature points by:

for each instance of the scans of the laser scanner, identifying a window that comprises scan lines from one or more scans occurring immediately before or after the instance of the scan, identifying a plurality of matching points from the one or more feature points extracted from the scan line data corresponding to one or more scans occurring immediately before or after the instance of the scan, adjusting the number of matching points based on a distance of the laser scanner to each of the plurality of matching points, and estimating a change in position of the laser scanner based on the adjusted number of matching points, obtain at least a portion of the sequence of images from the camera, and develop a camera odometry of the environment from the portion of the sequence of images, perform sensor fusion to supplement the laser scanner-based odometry with the camera odometry to develop a three-dimensional map of the environment, and save the three-dimensional map to a memory device.

* * * * *